(12) United States Patent
Damm et al.

(10) Patent No.: US 11,307,905 B2
(45) Date of Patent: Apr. 19, 2022

(54) METHOD AND A DEVICE COMPRISING AN EDGE CLOUD AGENT FOR PROVIDING A SERVICE

(71) Applicant: Telia Company AB, Solna (SE)

(72) Inventors: Rickard Damm, Nacka (SE); Michael Huber, Taby (SE)

(73) Assignee: Telia Company AB

( * ) Notice: Subject to any disclaimer, the term of this patent is extended or adjusted under 35 U.S.C. 154(b) by 108 days.

(21) Appl. No.: 16/909,473

(22) Filed: Jun. 23, 2020

(65) Prior Publication Data

US 2021/0004274 A1 Jan. 7, 2021

(30) Foreign Application Priority Data

Jul. 3, 2019 (SE) .................................... 1950838-1

(51) Int. Cl.
| | |
|---|---|
| *G06F 9/50* | (2006.01) |
| *G06F 3/06* | (2006.01) |
| *G06F 9/54* | (2006.01) |
| *H04L 12/46* | (2006.01) |

(52) U.S. Cl.
CPC .......... *G06F 9/5072* (2013.01); *G06F 3/0605* (2013.01); *G06F 3/0631* (2013.01); *G06F 3/0637* (2013.01); *G06F 3/0652* (2013.01); *G06F 3/0673* (2013.01); *G06F 9/546* (2013.01); *H04L 12/4641* (2013.01)

(58) Field of Classification Search
CPC .... G06F 9/5072; G06F 3/0605; G06F 3/0631; G06F 3/0637; G06F 3/0652; G06F 3/0673; G06F 9/546; H04L 12/4641; H04L 9/3239; H04L 2209/38; H04L 63/12; H04L 67/2814; H04L 63/0272; H04L 67/1097; H04L 29/06612; H04L 41/0803; H04L 47/70; H04L 47/76; H04L 47/78; H04L 65/1026; H04W 12/009; H04W 72/04

See application file for complete search history.

(56) References Cited

U.S. PATENT DOCUMENTS

| | | | |
|---|---|---|---|
| 9,009,468 B1 | 4/2015 | Zayed | |
| 2003/0135609 A1* | 7/2003 | Carlson | ............... H04L 67/1097 709/224 |
| 2012/0239792 A1* | 9/2012 | Banerjee | ............. H04L 67/1097 709/223 |

(Continued)

FOREIGN PATENT DOCUMENTS

| | | |
|---|---|---|
| KR | 2018 0047070 | 5/2018 |
| KR | 2018 0098798 | 9/2018 |

OTHER PUBLICATIONS

Notice from the Swedish Patent and Registration Office dated Apr. 1, 2020, for Swedish Patent Application No. 1950838-1.

*Primary Examiner* — Michael A Keller
(74) *Attorney, Agent, or Firm* — Burr & Forman LLP; Jeffrey H. Kamenetsky (57) ABSTRACT

The embodiments herein relate to a device and a method performed by an edge cloud agent, the method comprising: receiving a request for resources; locating a computing device, in the network, capable in providing the requested resources; instantiating a secure container on the located computing device; setting up a VLAN/VPN connection to the secure container on the computing device; and allocating said resources to a storage instance based on available resources within the computing device.

12 Claims, 10 Drawing Sheets

(56) References Cited

U.S. PATENT DOCUMENTS

| | | |
|---|---|---|
| 2014/0006347 A1 | 1/2014 | Qureshi et al. |
| 2014/0109171 A1* | 4/2014 | Barton et al. |
| 2017/0063839 A1* | 3/2017 | Barton ................... H04L 63/20 |
| 2017/0222977 A1* | 8/2017 | Newell ................. H04L 63/102 |
| 2020/0209816 A1* | 7/2020 | Cebasek .............. G05B 19/042 |

* cited by examiner

METHOD AND A DEVICE COMPRISING AN EDGE CLOUD AGENT FOR PROVIDING A SERVICE

TECHNICAL FIELD

The present disclosure generally relates to edge computing, and in particular to a method and a device comprising an edge cloud agent for the provision of services or applications in a secure way.

BACKGROUND

Edge computing is widely used as a way to describe methods of locating computing resources close to a user in a large and distributed network. Computation is largely performed on distributed device nodes. Edge computing pushes applications, data and computing power (services) away from centralized points to locations closer to the user. The target of edge computing is an application or general functionality needing to be closer to the source of the action where distributed systems technology interacts with the physical world. Edge computing does not need contact with any centralized cloud, although it may interact with one. In contrast to cloud computing, edge computing refers to decentralized data processing at the edge of the network. One drawback of edge computing is that it can increase attack vectors which is a security risk.

SUMMARY

It is an object of embodiments herein to solve at least the above-mentioned problem by providing a method and a device for the provision of services or resources in a secure way.

According to an aspect of embodiments herein, there is provided a method performed by an edge cloud agent in a device of an operator's network, the method comprising: receiving a request for resources; locating a computing device, in the network, capable in providing the requested resources; instantiating a secure container on the located computing device; setting up a Virtual Local Area Network/Virtual Private Network (VLAN/VPN) connection to the secure container on the computing device; and allocating said resources to a storage instance based on available resources within the computing device.

According to another aspect of embodiments herein, there is provided a device comprising an edge cloud agent in an operator's network, the device comprising a processor and a memory containing instructions executable by said processor whereby said device is operative to perform any of the method claims 1-7.

An advantage of embodiments herein is to provide resources in a secure and user-friendly manner.

Additional advantages by the embodiments herein will be described in more detail in the detailed description.

BRIEF DESCRIPTION OF THE DRAWINGS

Example of embodiments herein are described in more detail with reference to the attached drawings in which:

FIG. 10 illustrates a flowchart of a method according to some embodiments herein;

DETAILED DESCRIPTION

In the following, a detailed description of the exemplary embodiments is presented in conjunction with the drawings to enable easier understanding of the solutions described herein.

Figure 1A:
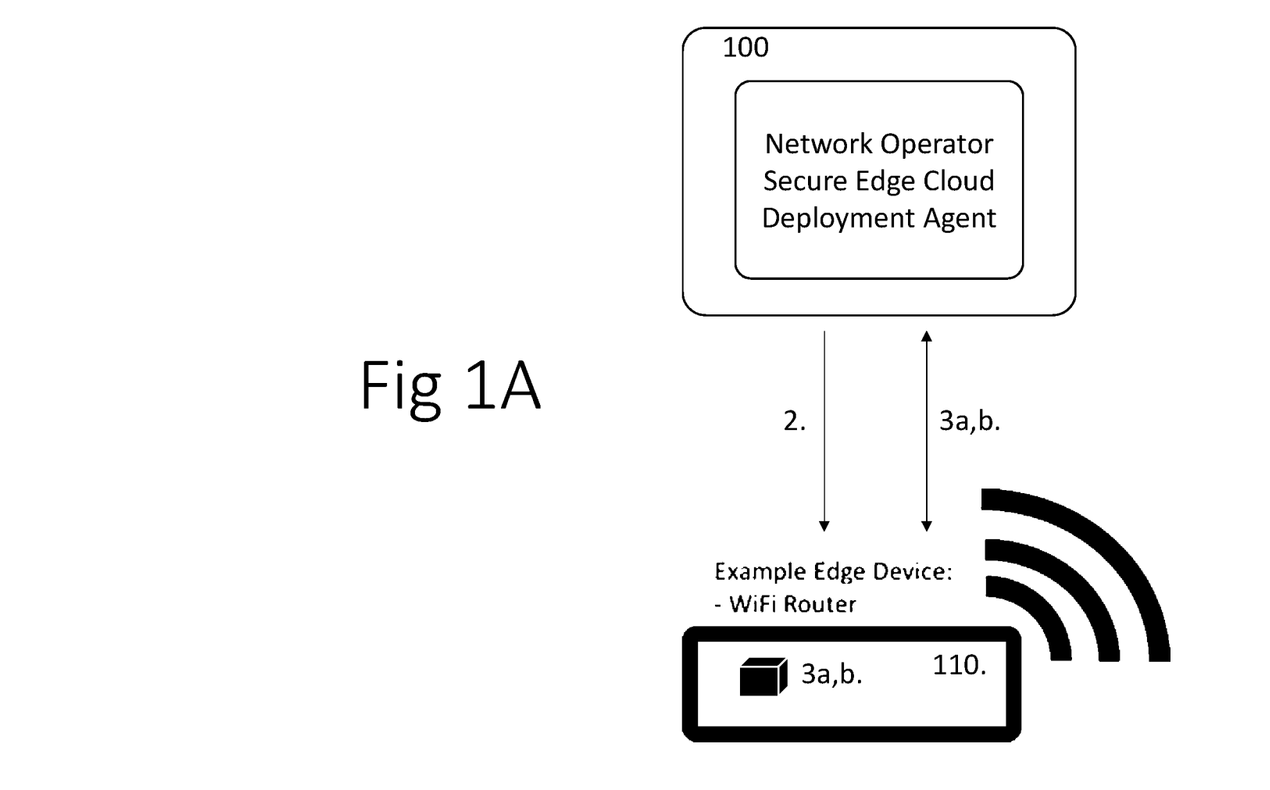
FIG. 1A illustrates a network scenario involving a network operator secure edge cloud deployment agent according to an exemplary embodiment. Employed.

Referring to FIG. 1A there is illustrated a network scenario involving a device 100 comprising an edge cloud agent in an operator's network. The network agent may be called a network operator secure edge cloud deployment agent which may be accessed through self-service and/or through automated mechanisms. The scenario of FIG. 1A also depicts an example of an edge device such as a WiFi router or a WiFi gateway which is a computing device or an edge computing device 110 that may reside in the operator's network or in a home environment of a user or in a shop or in an office, etc. The network deployment agent may cater for the timely deployment (and subsequent timely deletion) of:

2. VLAN/VPN
  Setting up a separate Virtual LAN (VLAN) or Virtual Private Network (VPN) from the operator cloud termination point (external or internal) to a secure container on the computing device or edge computing device 110 (ECD).

3a. Secure Container
  deploying a secure and isolated computer/storage instance.

It should be mentioned that a storage and compute may be handled differently. Storage could be a plain file system or a database such as MySQL or a memory storage place. Both of which would reside in the ECD 110.

3b. Capacity Limitations
  allocating capacity limitations to the computer/storage instance in line with the available resources within the edge computing device 110.

Figure 1B:
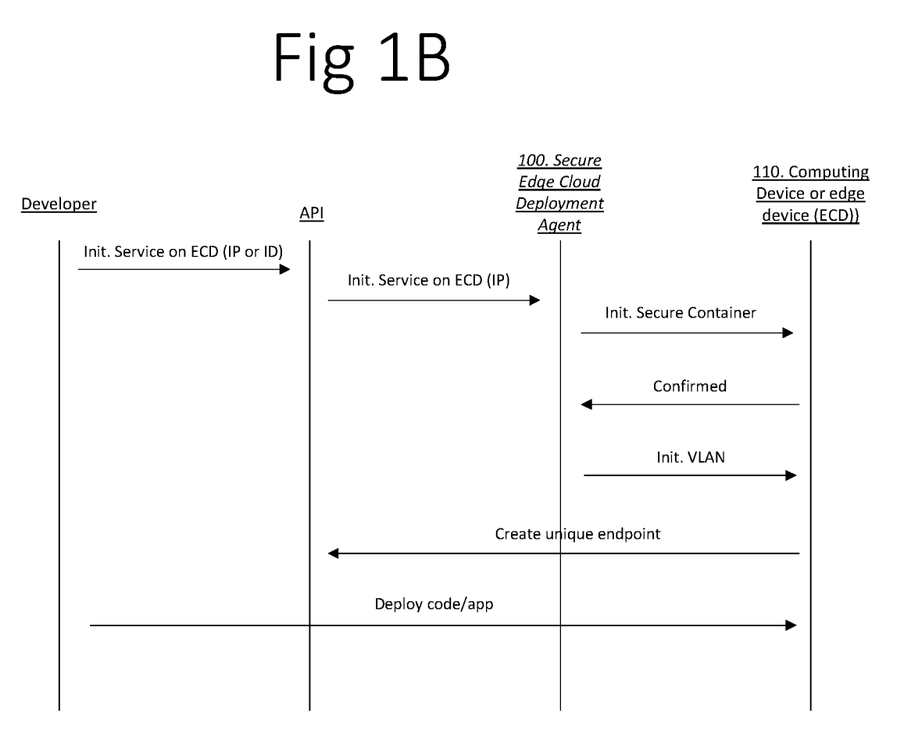
FIG. 1B is a signaling diagram according to some embodiments herein, for the network scenario of FIG. 1A.

FIG. 1B depicts a signaling diagram according to some embodiments herein.

A developer that wishes to deploy an application or a software or code using cloud computing uses an API (Application Programming Interface) to send a request for resources to the edge cloud agent 100. As an example, a provisioning request is received at the agent from the API, or a webpage (self-service) or is generated automatically by internal systems.

The edge cloud agent 100 locates a computing device (ECD) 110 in the network, which computing device is capable of providing the requested resources. The edge cloud agent then instantiates a secure container (or a cloud environment) on the located computing device 110 with compute/storage capacity limits appropriate for the specific ECD 110. After a confirmation is received from the ECD 110 confirming the instantiation of the secure container, the edge cloud agent 100 initiates setup of a VLAN/VPN connection to the secure container on the computing device 110. The setting up of a VLAN/VPN connection includes setting up a VLAN/VPN connection from a cloud termination point of the operator to the secure container on the computing device. The edge cloud agent 100 then allocates the requested resources to a storage place/instance, based on available resources within the computing device 110.

The developer or an edge cloud consumer may now deploy software or code or an application to the secure container of the computing device 110 in a secure way using the VLAN/VPN connection.

By having the edge cloud agent residing "inside" the operator's network, the operator has real time or close to real time knowledge of conditions in the network and what resources are available in the edge computing device. This allows the agent to allocate resources in a faster and more secure manner.

Figure 1C:
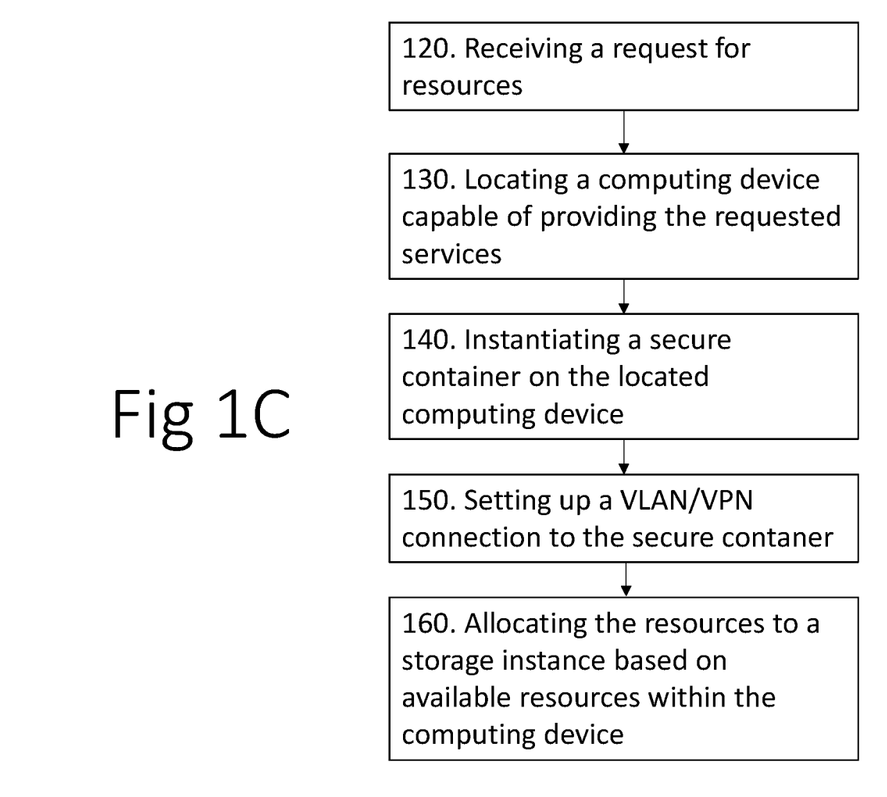

Referring to FIG. 1C, there is illustrated a flowchart of a method performed by the edge cloud agent 110 as previously described. The main steps include:

(120) receiving a request for resources;

(130) locating a computing device, in the network, capable of providing the requested resources;

(140) instantiating a secure container on the located computing device;

(150) setting up a VLAN/VPN connection to the secure container on the computing device; and (160) allocating said resources to a storage instance based on available resources within the computing device.

Figure 2A:
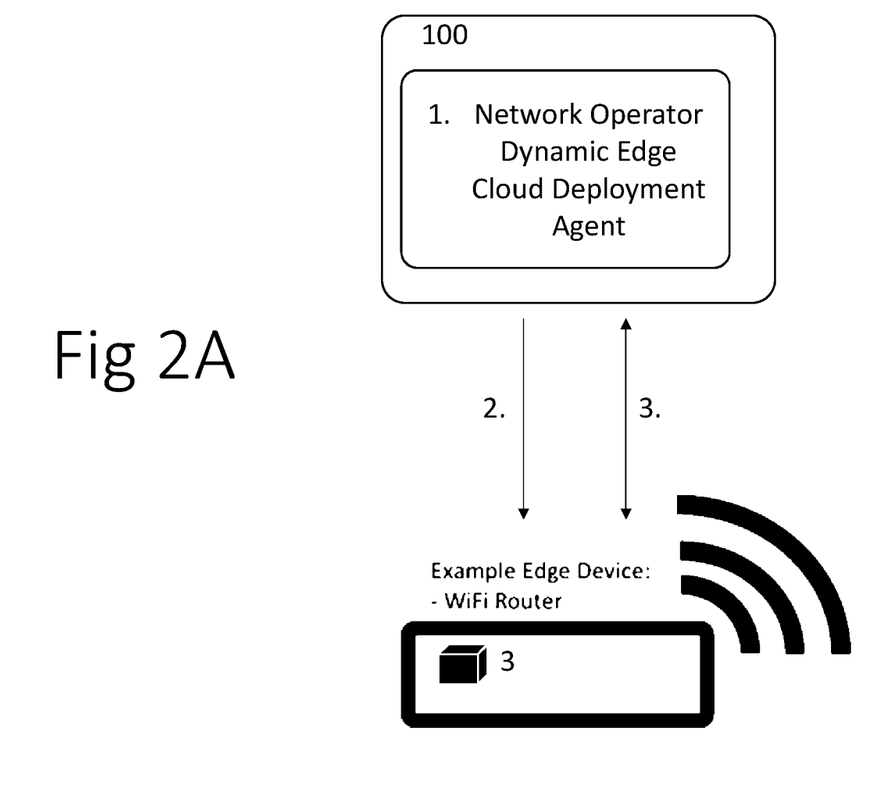
FIG. 2A illustrates a network scenario involving a network operator dynamic edge cloud deployment agent according to an exemplary embodiment.

The edge cloud 100 agent may reside both in the cloud of the operator of the network and in the edge computing device 110. The edge cloud agent 100 may also be referred to as a dynamic edge cloud deployment agent (see FIG. 2A) and is operative to:

2. detect a presence of at least one user device connected to the network wherein the computing device 110 is residing and said user device is consuming said resources; and 3. when the user device leaves said network, informing said user device that the storage instance will be terminated within a predetermined time period; and terminating said storage instance upon expiry of the time period. The time period can take any value, e.g., 1 minute or 5 minutes etc.

Figure 2B:
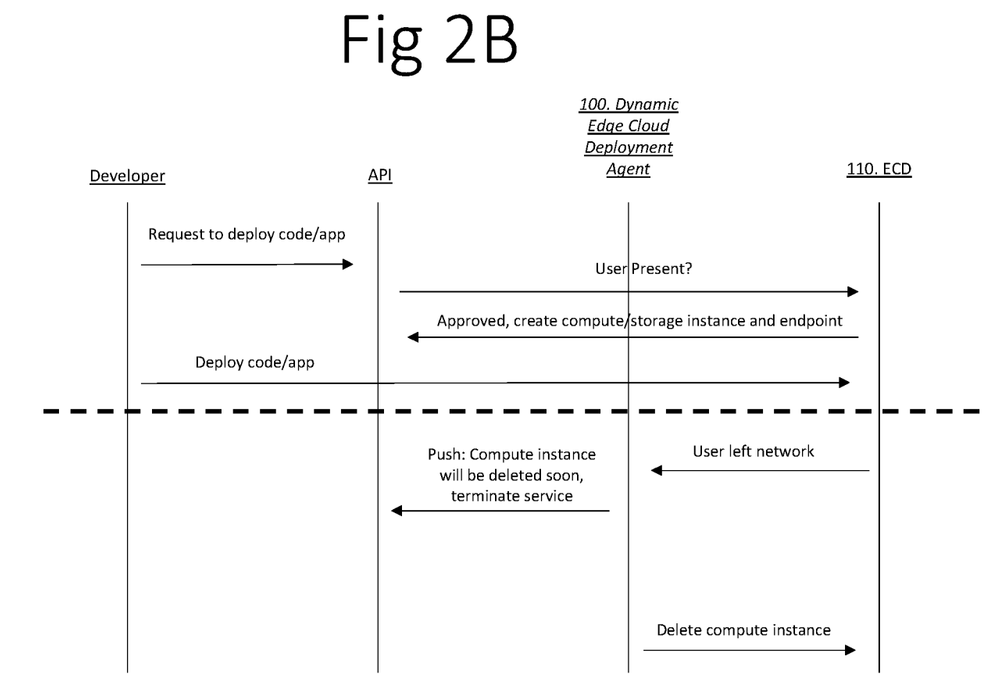
FIG. 2B is signaling diagram according to some embodiments herein, for the network scenario of FIG. 2A.

Referring to FIG. 2B, there is illustrated a signaling diagram according to an embodiment herein for the scenario of FIG. 2A. Assuming now that a user device or a developer requests to deploy a code or an application making use of an API. The edge cloud agent which may reside in the device 100 or in the edge computing device 110 (such as a gateway) is configured to detect user presence by detecting at least one user device connected to a network. Assuming that the user is present, and the request to deploy the code is approved, the user device or the developer deploys the code or application. As previously described, a storage instance may be allocated if not already allocated. As soon as the user device of the storage instance leaves said network, the edge cloud agent will initiate a termination request for the local edge cloud storage instance. The user device is informed by the edge cloud agent, for example using a push message through the API, that the storage instance will be terminated within a predetermined time period, and then the edge cloud agent terminates or deletes the edge cloud storage instance or compute instance (of the ECD 110) after the expiry of the time period.

The mechanism described above increases security to the edge deployment, and saves resources (energy, CPU etc.) that might have been wasted on idle users. The code or application running in the storage instance will only be able to run while the user device is present in the network.

According to another exemplary embodiment, the edge cloud agent may further be configured to analyze storage capabilities of the computing device in real time. This may be the case since a user should be able to extend the storage capabilities of the device by, e.g., plugging or attaching an external storage drive, e.g., a USB or similar, to the computing device. This information on the storage capabilities is provided in real time to the edge cloud agent residing in the network that could externalize this information through, e.g., an API so that applications can be adapted.

Figure 3A:
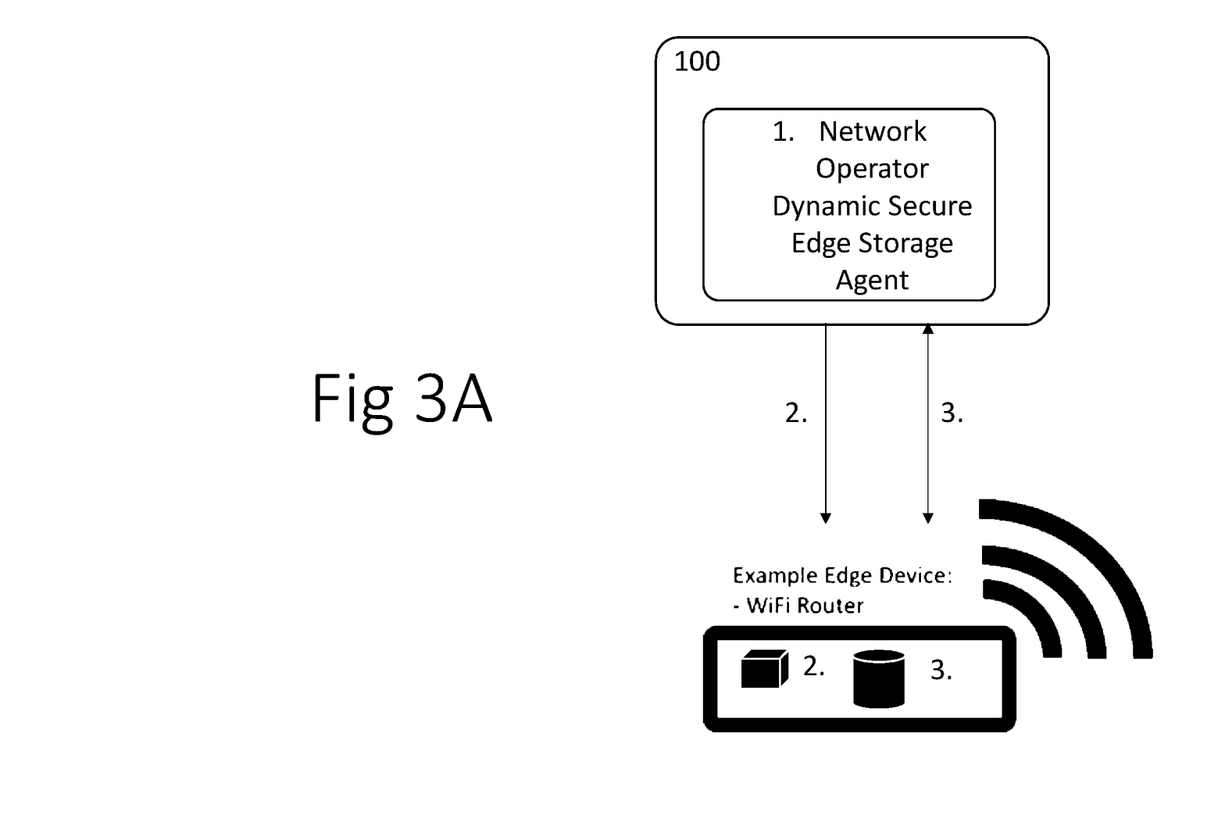
FIG. 3A illustrates a network scenario involving a network operator secure edge storage agent.

The edge cloud agent in the device 100 may be referred to as a dynamic secure edge cloud storage agent as shown in FIG. 3A. This agent may also reside in the edge computing device 110. The functionality of the agent may include:

2. Real time analysis of storage capabilities in the edge computing device, as described above.

3. Dynamic deployment of secure storage volume on the edge computer device. The edge cloud agent 1 may deploy or delete the edge storage instance when needed. The storage volume may be in the form of a file system or some form of appropriate database. The edge cloud agent may apply a secure wrapper around the storage volume. This could be in the form of a file system which may be encrypted. Access will be granted only to intended application(s) through the use of a password, certificate or similar.

The mechanism described above may be used for a variety of services ranging from caching of content to storage of images. Other user cases may be as local "working memory" for applications that require a lot of temporary storage.

Figure 3B:
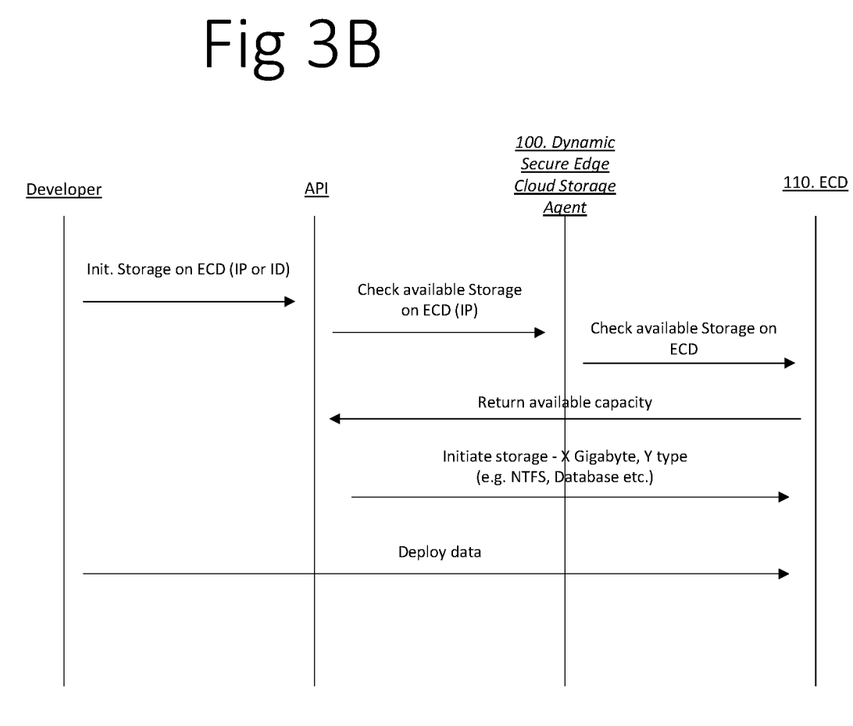
FIG. 3B is a signaling diagram according to some embodiments herein, for the network scenario of FIG. 3A.

Referring to FIG. 3B, there is illustrated a signaling diagram according to the embodiment described above. As an example, a check request for available storage capabilities on the edge computing device may be received through the API at the edge cloud agent which in turn is sent to the computing device 110. The edge cloud agent acquires the storage capability information which is then communicated though the API to, e.g., external cloud consumers so that they can adapt their respective services programmatically since different computing devices might have different available capacity limitations. Based on the storage capability information received, the edge cloud agent may initiate, in the secure container, a storage volume, e.g., X-Gigabyte, Y Type (e.g., NTFS Database, etc.). This enables the developer or user to deploy data or application. Hence, deployment (or deleting) of storage instance, in the secure container, of the computing device may be performed based the acquired storage capabilities.

Figure 4:
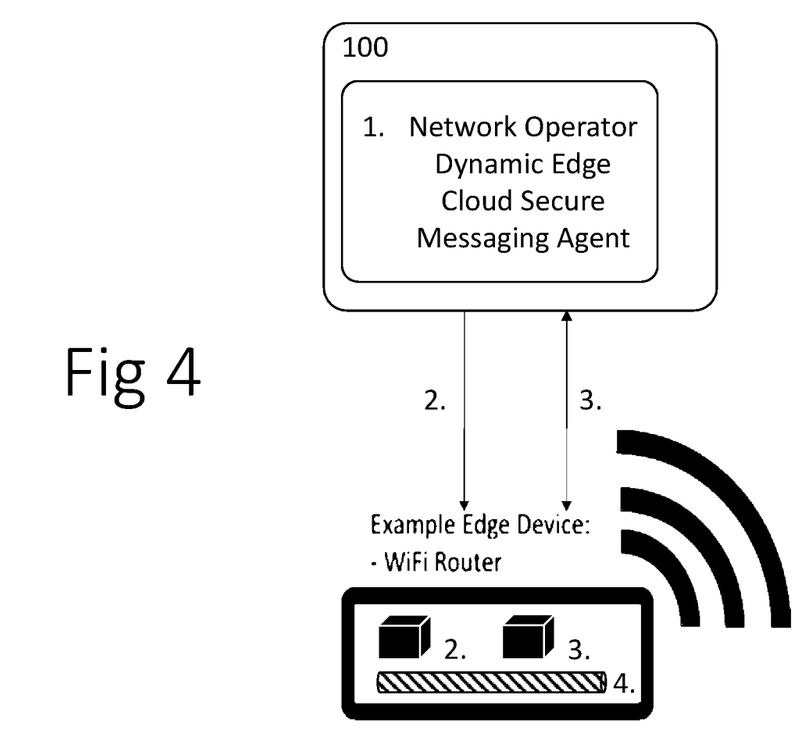
FIG. 4 depicts a network scenario involving a network operator dynamic edge cloud secure messaging agent.

According to an embodiment, the edge cloud agent which may reside in the device of the operator's network and in computing device(s) is configured to allow difference edge cloud applications (running in an edge cloud environment) to communicate with each other, and users/devices over a local messaging bus 4 which is depicted in FIG. 4. The edge cloud agent is configured to keep a real time view of all computing devices and instances and an agent 2 may be configured to analyze in real time users present in the network. Agent 2 may be referred to as a real time user validation agent.

According to an embodiment, a dynamic security and policy agent 3 which can reside in the operator's network or in the computing device is configured to create policies and security rules around every cloud instance based on information from agent 2. These policies and/or security rules may be enforced on the communication messaging bus 4 in order to, e.g., prohibit data leakage between applications, etc. As an example, the set of rules may include allowing a first service in a first container to only send messages to a second user and a third user, while a second service may be allowed to send and receive messages to/from all users connected to the computing device.

According to an embodiment, for each application received at the edge cloud agent and aimed to be run on the edge cloud instance, the edge cloud agent is configured to test said application to determine if the application is valid or not. If the application is determined to be valid, a unique fingerprint is assigned to the application. A mechanism using a checksum may be used to cryptographically generate the unique fingerprint or a unique identifier for the application. This unique fingerprint may then be stored in a shared ledger (e.g., Merkel-tree or blockchain) which can be accessed by edge cloud devices or computing devices and this unique fingerprint cannot be tampered or manipulated. The computing devices may also include a validation agent and the edge cloud agent may be referred to as an edge cloud validation agent.

Figure 5A:
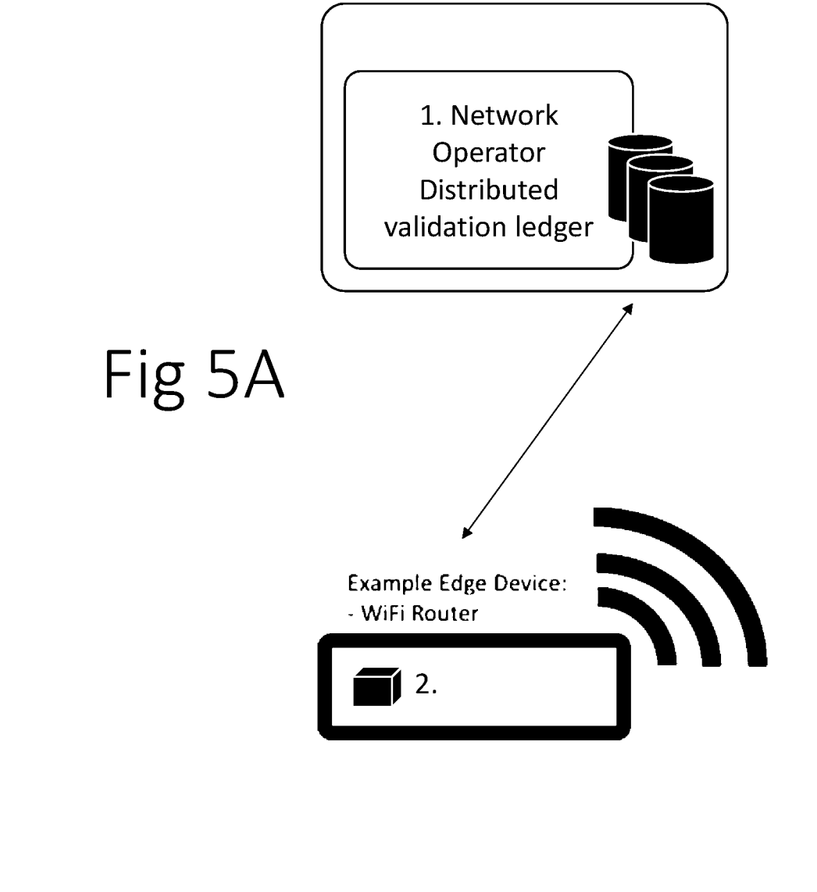
FIG. 5A depicts a network scenario involving a network operator distributed validation ledger.
Figure 5B:
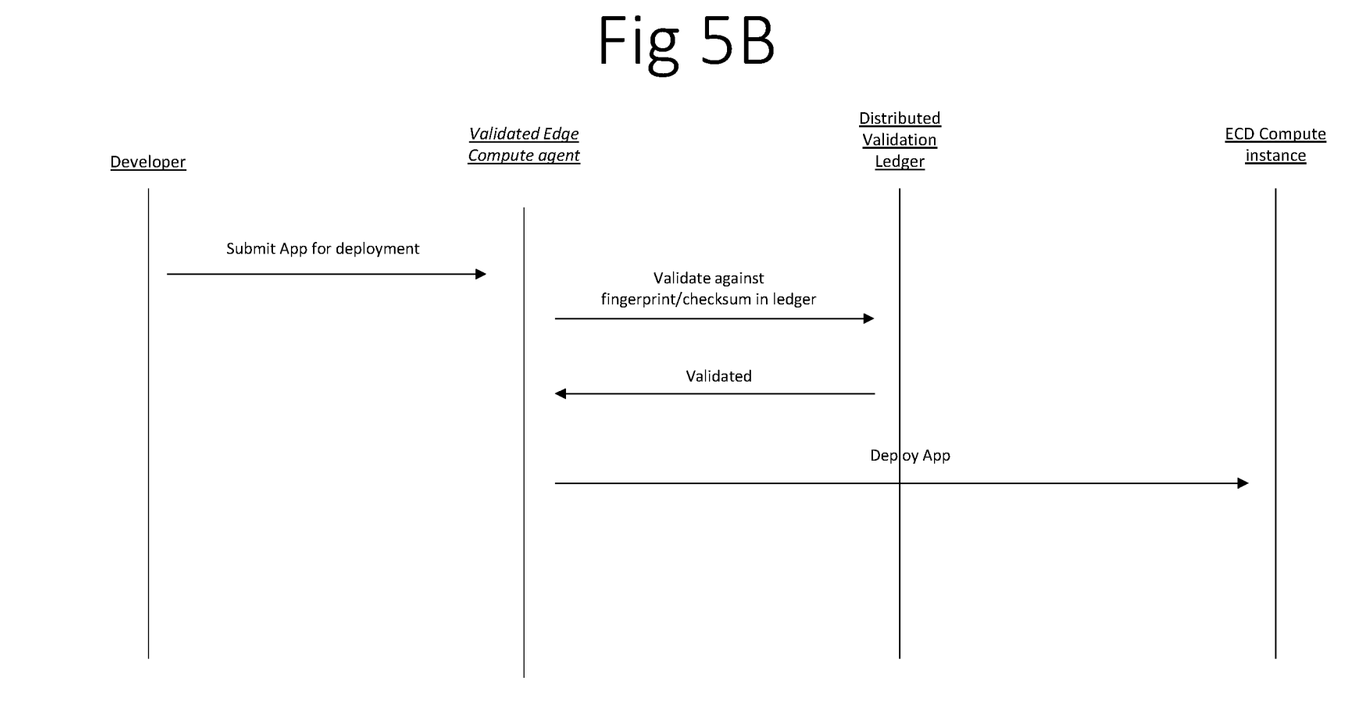
FIG. 5B is a signaling diagram according to an embodiment herein, for the network scenario of FIG. 5A.

FIG. 5A and FIG. 5B illustrate the scenario involving the validation ledger at the operator's network. As shown in FIG. 5B, a developer may submit an application or code for deployment to an edge compute agent or edge cloud agent which includes a validation agent which checks, using the (distributed) validation ledger, against the stored fingerprint whether the application is valid or not. If the application is determined to be valid, the application may be deployed to the storage instance of the computing device where it can be executed or run. If the application is determined not to be valid, it will be deleted from the cloud. Hence, unvalidated applications are prohibited to run in the edge cloud environment which leads to an increase in security.

As previously mentioned, there is provided a device comprising an edge cloud agent in an operator's network, the device comprising a processor and a memory containing instructions executable by said processor whereby said device is operative to:
receive a request for resources;
locate a computing device, in the network, capable of providing the requested resources;
instantiate a secure container on the located computing device;
set up a VLAN/VPN connection to the secure container on the computing device; and
allocate said resources to a storage instance based on available resources within the computing device for enabling a user device or a developer to deploy an application or code to the secure container or storage instance of the computing device.

Additional details performed by the device or the agents of the device have already been described and need not be repeated.

There is further provided a computer program comprising instructions which when executed on at least one processor residing in the device causes the processor to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. In particular, the embodiments herein may be applicable is any wireless system employing cloud computing, including 4G, 5G.

The invention claimed is:

1. A method performed by an edge cloud agent in an operator's network, the method comprising:
receiving a request for resources;
locating a computing device, in the network, capable of providing the requested resources;
instantiating a secure container on the located computing device;
setting up a Virtual Local Area Network/Virtual Private Network, VLAN/VPN, connection to the secure container on the computing device;
allocating said resources to a storage instance based on available resources within the computing device; and
for each application received at the edge cloud agent, testing to determine if the application is valid or not;
if the application is determined to be valid,
assigning a unique fingerprint to said valid application and storing said unique fingerprint in a shared ledger which is accessible to at least one computing device including a validation agent; and
if the application is determined to be invalid,
deleting the application.

2. The method according to claim 1, wherein setting up a VLAN/VPN connection includes setting up a VLAN/VPN connection from a cloud termination point of the operator to the secure container on the computing device.

3. The method according to claim 1, further comprising:
detecting a presence of at least one user device connected to the network where the computing device is residing and said user device is consuming said resources;
when the user device leaves said network, informing said user device that the storage instance will be terminated within a predetermined time period; and
terminating said storage instance upon expiry of the predetermined time period.

4. The method according to claim 1, further comprising:
acquiring storage capabilities of the computing device; and
deploying or deleting at least one storage instance of the computing device on the basis of the acquired storage capabilities.

5. The method according to claim 1, further comprising:
allowing different cloud applications running in the edge cloud to communicate with each other and user devices over a local messaging bus; and
assigning policies to said message bus based on a set of rules.

6. The method according to claim 5, wherein the set of rules includes allowing a first service in a first container to only send messages to a second user device and a third user device, while a second service is allowed to send and receive messages to/from all user devices connected to the computing device.

7. A device comprising an edge cloud agent in an operator's network, the device comprising a processor and a memory containing instructions executable by said processor whereby said device is operative to:

receive a request for resources;

locate a computing device, in the network, capable of providing the requested resources;

instantiate a secure container on the located computing device;

set up a Virtual Local Area Network/Virtual Private Network, VLAN/VPN, connection to the secure container on the computing device; and allocate said resources to a storage instance based on available resources within the computing device; and for each application received at the edge cloud agent, test to determine if the application is valid or not;

if the application is determined to be valid, assign a unique fingerprint to said valid application and storing said unique fingerprint in a shared ledger which is accessible to at least one computing device including a validation agent; and if the application is determined to be invalid, delete the application.

8. The device according to claim 7, wherein the setting up of the VLAN/VPN connection includes setting up a VLAN/VPN connection from a cloud termination point of the operator to the secure container on the computing device.

9. The device according to claim 7, further operative to:

detect a presence of at least one user device connected to the network where the computing device is residing and said user device is consuming said resources; and when the user device leaves said network, inform said user device that the storage instance will be terminated within a predetermined time period; and terminating said storage instance upon expiry of the time period.

10. The device according to claim 7, further operative to:

acquire storage capabilities of the computing device; and deploy or delete at least one storage instance of the computing device on the basis of the acquired storage capabilities.

11. The device according to claim 7, further operative to:

allow different cloud applications running in the edge cloud to communicate with each other and user devices over a local messaging bus; and assigning policies to said message bus based on a set of rules.

12. The device according to claim 11, wherein the set of rules includes allowing a first service in a first container to only send messages to a second user device and a third user device, while a second service is allowed to send and receive messages to/from all user devices connected to the computing device.

* * * * *